United States Patent [19]

Alcaide

[11] 4,184,048

[45] Jan. 15, 1980

[54] SYSTEM OF AUDIOCONFERENCE BY TELEPHONE LINK UP

[75] Inventor: André Alcaide, Longjumeau, France

[73] Assignees: Etat Francais, Issy les Moulineux; Sous-marins et du Radio, Paris, both of France

[21] Appl. No.: 903,916

[22] Filed: May 8, 1978

[30] Foreign Application Priority Data

May 9, 1977 [FR] France ................. 77 14092

[51] Int. Cl.² .................................................. H04M 3/56
[52] U.S. Cl. .............................. 179/1 CN; 179/15 BA; 179/84 VF
[58] Field of Search ................ 179/1 CN, 1 H, 1 HF, 179/15 FD, 15 AL, 15 BA, 84 VF

[56] References Cited
U.S. PATENT DOCUMENTS 3,508,007  4/1970  Goodall et al. .................. 179/1 CN
3,882,276  5/1975  Feiner et al. .................... 179/1 CN

Primary Examiner—Malcolm A. Morrison
Assistant Examiner—E. S. Kemeny

Attorney, Agent, or Firm—Abraham A. Saffitz

[57] ABSTRACT

Audioconference system for conference connecting a plurality of groups of remotely located conferees, which comprises a loudspeaker assembly and a plurality of microphones respectively assigned to the conferees and grouped in pairs of microphones diametrically opposite with respect to the loudspeaker assembly. The output signals of the first microphones of the pairs are directly connected to a mixing circuit whereas the second microphones of the pairs are connected to this mixing circuit through a 180° phase shifter. The signal components originating from the loudspeaker assembly and picked up by the microphones due to acoustical coupling between the loudspeaker assembly and the microphones are thus cancelled. Further the addresses of the conferees who are talking are derived from the detected voice signals and this detection is made through a pass-band filter. The transmission of the voice signals to the other conference rooms is made through a stop band filter having a stop band substantially equal to the pass-band of the pass-band filter.

3 Claims, 8 Drawing Figures

SYSTEM OF AUDIOCONFERENCE BY TELEPHONE LINK UP

BACKGROUND OF THE INVENTION

1. Field of the Invention

This invention relates to telephone systems and, more particularly to an audio system for conference connecting two or more groups of remote conferees in a manner which approaches a true face-to-face conference situation. Such a system makes it possible to reproduce a collective conversation under conditions analogous to those in a conference bringing all the participants together, by means of conventional subscriber telephone lines of the four wire type. Furthermore, this invention relates more especially to devices for protecting against self-priming or self oscillating in telephonic transmission and to the detection of the speakers' identity.

Generally speaking, an audioconference system comprises, in each conference room, a conference table carrying a loudspeaker assembly transmitting the audiofrequency signals received from the distant conference rooms and a specific number of microphones allocated to the conferees in each room. The output signals of all the microphones in a room are mixed and the composite signal thus obtained is transmitted to the distant rooms where it is applied to the loudspeakers of the rooms. Further the audiofrequency signals originating from the conferees in a room are detected and the identity or address of the presently speaking conferee is deduced from these detected signals. The said address is transmitted to the other rooms through a particular channel.

2. Description of the Prior Art

U.S. Pat. No. 3,601,530 to Robert C. Edson et al. discloses an audio and video system for conference connecting a plurality of groups of remotely located conferees, comprising a plurality of video cameras disposed at a group location so that the field of view of each camera is respectively restricted to a small number of persons in the group, a plurality of microphones positioned before said group with the microphones being equal in number to said plurality of video cameras, the microphone positions with respect to said group corresponding to the fields of view of the cameras, means for transmitting video signals from said group location to one or more remote group locations, and voice voting and switching means coupled to said microphones for determining the location of the person in the group who is talking and in response thereto preempting connecting the camera covering the talker to the video-transmitting means.

In this system the levels of the speakers' voices are compared and priority is given to the speaker having the loudest voice. This has the practical disadvantage of allowing any conferee to cut short a speaker even if he has not the ability to do so.

Audioconference systems are looped systems due to coupling between the loudspeaker and microphones in two distant rooms and are particularly subject to Larsen or self-priming effect.

Devices for protecting against self-priming are known in the art and consist in using variable attenuators which are controlled by a control circuit dependent, for example, on the amplitude of the receive channel signal assigned to the loudspeaker assembly. Hence, when a speaker in a given room talks to the other speakers in the distant rooms, the gain in the transmit channel originating from the microphones is increased and the gain in the receive channel is simultaneously reduced and vice versa. This variation can be progressive depending on the acoustic pressure levels of the speakers' voices in the two channels or constant and independent of these levels. In both cases, the sum of the transmit channel gain and the receive channel gain and the coupling between the microphones and the loudspeaker assembly is to be kept constant and less than unity.

In such systems where the sums of the gains of priming is kept constant, there is always a self-priming coupling between the microphones and the loudspeaker assembly which restricts the listening level.

SUMMARY OF THE INVENTION

The main object of the invention is to provide an audioconference system in which the acoustic residual level due to self-priming is totally eliminated in the transmit channel, which, as a corollary, allows any amplification of the audiofrequency signals transmitted.

To this end, after preamplification, the audiofrequency signals coming from each group of a specific number of microphones equidistributed around the center of the table are given a phase shift which is equal for a given microphone to the polar angle of the microphone around the table.

If the number of microphones is an even number, the microphones are grouped by pairs of two microphones diametrically opposite with respect to the loudspeaker assembly. One of the microphones of the pair is connected directly to the mixing circuit and the other microphones of the pair is connected through a 180° phase shifter to the mixing circuit. Thus the components of the signal resulting from the coupling between the loudspeaker and the microphones are cancelled during the mixing operation of the two output signals of the microphones.

Another object of the invention is to prevent the cutting short of a conferee who has begun to speak.

The identification device associated with a table in an audio-conference system complying with the invention is not based on the comparison of the acoustic levels of the speakers' voices but, on the contrary, on the intervention speed of the speaker wishing to take the floor. In other words, once a speaker begins talking with a voice the acoustic level of which is above a first predetermined acoustic threshold, he will keep his turn to speak so far as his voice is above a second predetermined acoustic threshold lower than the first threshold whatever the acoustic levels of the other speakers' voices. In addition, the detection assembly makes it possible not to change the identification of the speaker during speaking when only brief interruptions occur in the audiofrequency signal from the speaker corresponding to intervals between syllables or words.

BRIEF DESCRIPTION OF THE DRAWINGS

The invention will be understood more clearly after reading the description of an embodiment thereof and after examining the hereto appended drawings, in which.

DESCRIPTION OF THE PREFERRED EMBODIMENT

Before describing the make-up and lay-out of an audioconference system allocated to a room taking a group of a specific number of speakers participating in a conference with other groups of speakers located in remote rooms, the main characteristics of the sound pick-up equipment of an audioconference table according to the prior art will be called back to mind.

It will be assumed in what follows, as an unlimiting example, that six speakers $L_1$ to $L_6$ may be seated around each table in an audioconference room.

Figure 1:
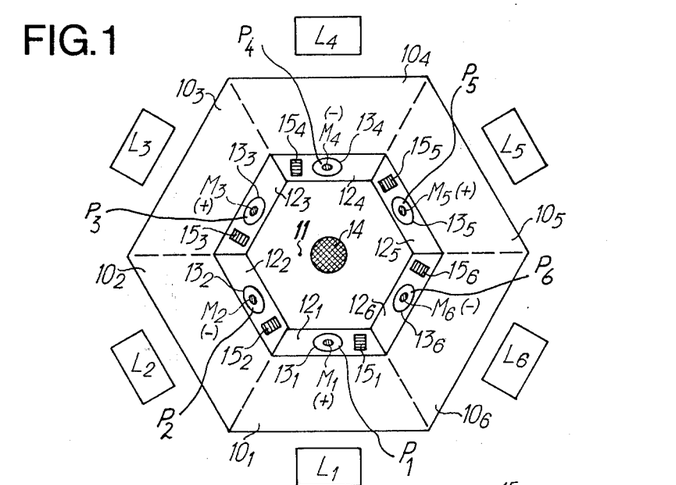
FIG. 1 is a view from above of an audioconference table.

Audioconference table 1, viewed from above in FIG. 1, presents a regular hexagonal section around the edge of which six panels $10_1$ to $10_6$ each having an isosceles trapezoid form surrounding the hexagonal central part 11. Speaker L in an appropriate sitting position is opposite box 12 enclosing voice pick-up device 13 located adjacent to the circumference of central part 11.

Each voice pick-up 13 (not shown) includes a hollow open paraboloid P at the focal point of which miniature microphone M is suitably held and directed towards the head of the paraboloid. Microphone M transmits the voice from the speaker by reflection on the wall of the paraboloid. It is omnidirectional of the electret type, the omnidirectionality of the microphone enhancing the sensitivity of the associated pick-up device.

The chief advantage of this type of pick-up lies in the more or less complete absence of secondary back lobes on its beam pattern, this enabling loudspeaker assembly 14 placed in the middle of central part 11 to considerably reduce the self-priming or self-oscillating caused by the Larsen effect in audiofrequency transmission between audioconference rooms.

Moreover, so as to restrict more fully the Larsen effect, each audioconference room is suitably laid-out acoustically through the use of light-weight acoustic absorption and sound proofing panels which lower the reverberation time of the room and which also increase the direct field propagation distance around the loudspeaker assembly 14. The overall dimensions of audioconference table 1 are appropriately selected, such that only the direct acoustic field originating from the loudspeaker assembly is possibly received by microphones $M_1$ to $M_6$. This direct field is borne in mind in what follows in order to totally eliminate the self-priming effect between the loudspeaker or loudspeakers of loudspeaker assembly 14 and the microphones distributed symetrically about the middle of central part 11.

Figure 2:
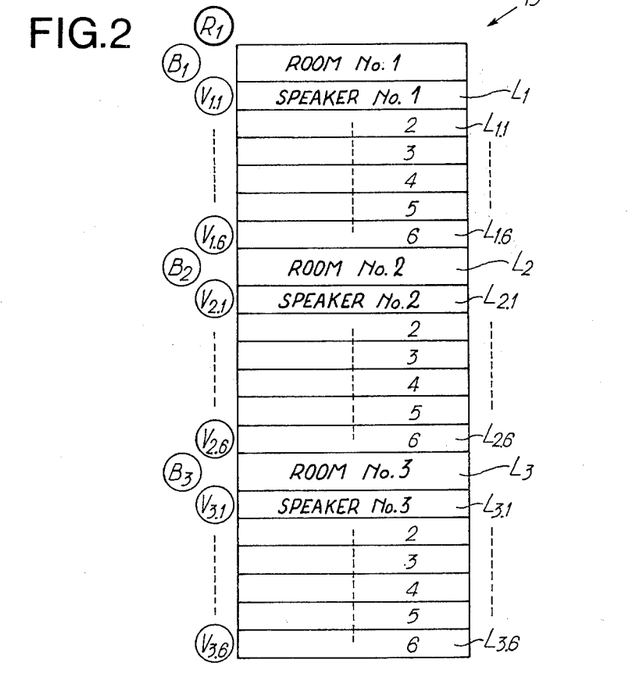
FIG. 2 shows a signalling indication chart located on a speaker's panel.

The speaker's identification means or signalling indicators are in the form of a display board 15 like that represented schematically in FIG. 2 and allotted to speaker $L_1$. To each panel $10_1$ to $10_6$ is associated a display board 15 comprising for example a red indicator lamp $R_1$ whose illumination confirms that the system has detected an audiofrequency signal originating from the speaker $L_1$ considered and has transmitted the address of this speaker to the distant rooms, blue indicator lamps $B_1$ to $B_3$ allocated to the other rooms respectively, for instance 3 rooms as per this example, which signal, when one of them is lit up, that one of the speakers in another room has began talking, three groups of six green indicator lamps $V_{1,1}$ to $V_{1,6}$, $V_{2,1}$ to $V_{2,6}$, $V_{3,1}$ to $V_{3,6}$ whose illumination identifies the 18 speakers in the distant rooms respectively, registration lines $L_{1,1}$ to $L_{1,6}$, $L_{2,1}$ to $L_{2,6}$, $L_{3,1}$ to $L_{3,6}$ giving the name of the corresponding speaker and registration lines $L_1$ to $L_3$ identifying the distant room such as, for example, a place name, these registration lines being opposite each V and B indicator lamp. These lines are filled in, for instance, during a quick presentation of the speakers at the outset of a conference.

Each display indicator lamp is, for example, an electroluminescent diode. When there is nobody talking, the red indicator and the green one, corresponding to the last speaker in the room and the last distant speaker respectively, remain lit up.

Each audioconference room is appropriately connected to an automatic switching network by a four-wire telephone line, for example of the type with two pairs of symetrical wires, one of said pairs serving as the transmit channel and the other as the receive channel. Thus, the audiofrequency voice signals and the identification signals are transmitted to the other rooms in a similar fashion to that of a normal telephone link-up between the telephone line assigned to the said room and those lines assigned to the other rooms.

Figure 3A:
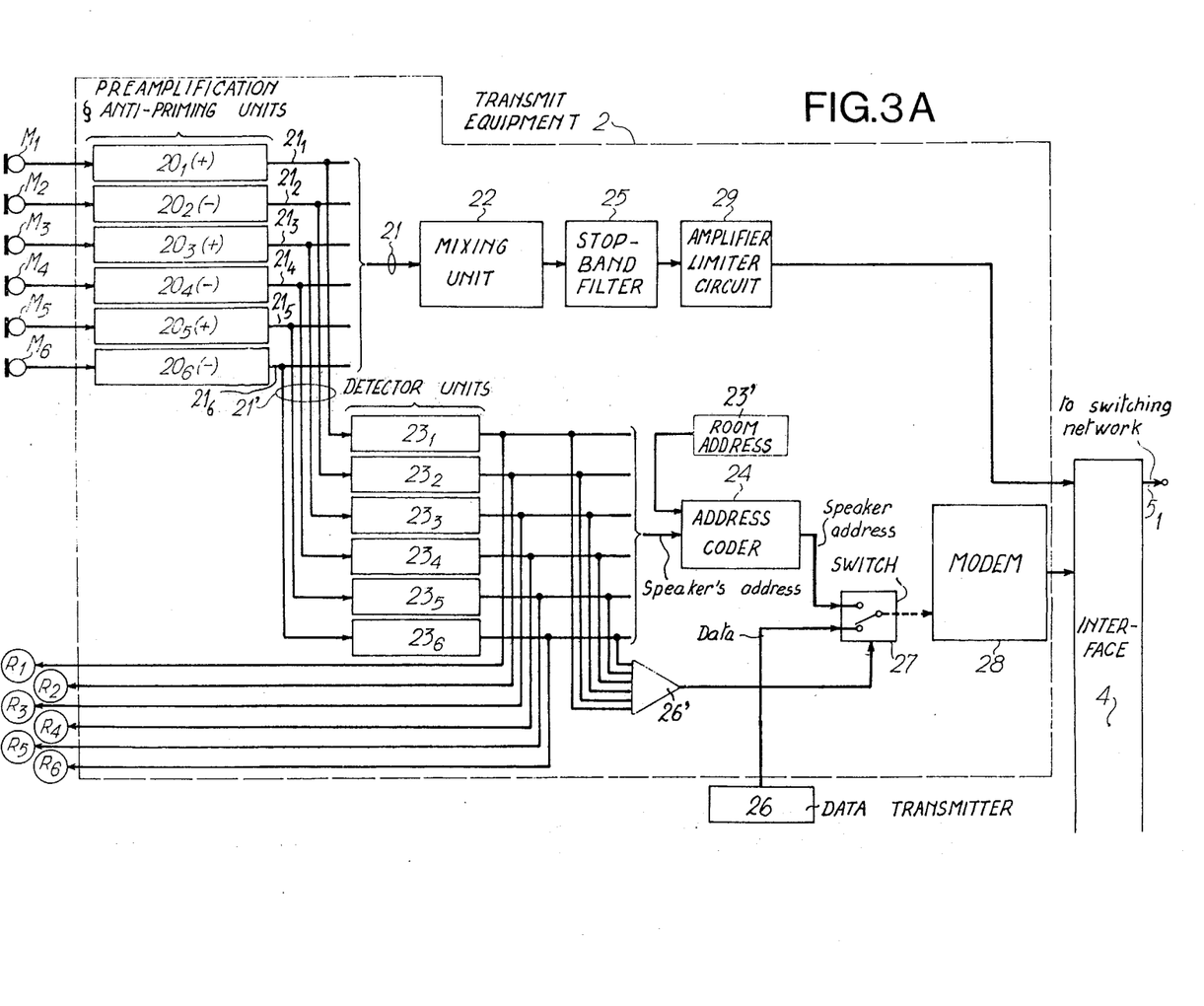
FIGS. 3A and 3B are block diagrams of the transmit and receive equipments associated with a conference table of an audioconference system complying with the invention.
Figure 3B:
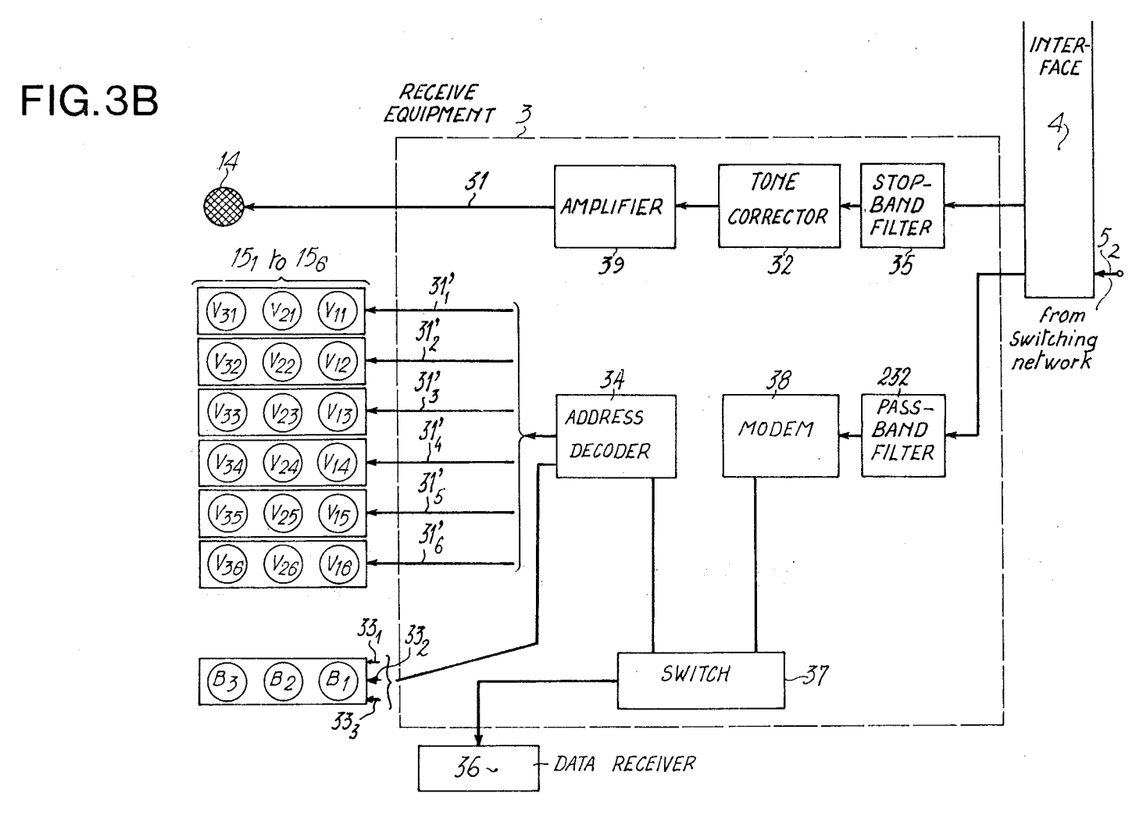

Fererring now to FIGS. 3A and 3B, a conference table in a room is connected to transmit equipment 2, for the audiofrequency voice signals coming from six microphones $M_1$ to $M_6$ in the room properly mixed with the audiofrequency identification signals, and to receive equipment 3 for the mixed signals originating from the other rooms. The receive equipment controls the loudspeaker assembly 14 and the indicator lamps B and V on the display boards in the room. Interface 4 interconnects the transmit and receive equipments 2 and 3 to the telephone lines $5_1$–$5_2$.

Connection between the telephone lines of the four rooms is made through a switching network allowing an incoming telephone line to be selectively connected to a plurality of outgoing telephone lines. Switching networks capable of connecting together for conference purpose more than two telephone lines are known in the art and need not to be fully described here.

In transmit equipment 2 in FIG. 3A, the six microphones $M_1$ to $M_6$ transmit the audiofrequency signals to six preamplifier and anti-priming units $20_1$ to $20_6$ which will be described later on in more detail. The basic feature of these units lies in the 180° phase-shift between the audiofrequency signals transmitted by pairs of microphones diametrically opposite with respect to loudspeaker assembly 14. Then the suitably phase-shifted audioquency signals are transmitted through two six-wire bus bars 21 and 21' to mixing unit 22 and an assembly of six detector units $23_1$ to $23_6$ which together with an address coder 24 generate the speakers' addresses. Each detector 23, the structure of which will be explained later on, sends to address coder 24 a signal identifying the speaker who has began talking and sends also a signal to the associated red indicator $R_1$. Detector units $23_1$ to $23_6$ comprise a pass band filter 232 tuned on one and the same audiofrequency F in order to obviate any detection of any acoustic levels transmitted by loudspeaker assembly 14 through coupling across microphones $M_1$ to $M_6$. Indeed, the mixed signals originating from mixing unit 22 pass through stop-band filter 25 having a determined bandwidth $\Delta F$ centred about the frequency F, so that loudspeaker assembly 14 of another room won't activate the associated detectors $23_1$ to $23_6$ by acoustic coupling. In the opposite case, i.e. without complementary stop-band and pass-band filters 25 and $23_2$, these would be audible sounds received which would induce, above a selected acoustic level threshold, a wrong identification of the presently speaking speaker by the detector units.

The $\Delta F$ band assigned to the identification function is, for example, 300 Hz wide and centred about a frequency of 1770 Hz. This band corresponds favourably to a telegraphic channel using the 1620–1920 Hz frequency range which can be employed both for the identification transmission and for data transmission.

In this connection, the output of address coder 24 and the output of a data transmitter 26 are respectively connected to the two inputs of switch 27 whose output is connected to modem 28. The output terminals of detector units $23_1$ to $23_6$ are connected to the inputs of OR-gate 26' whose output is connected to the control terminal of switch 27. When no speaker address is to be transmitted, switch 27 connects data transmitter 26 to modem 28. When a speaker address is to be transmitted, a control signal appears at the output of OR-gate 26' which operates switch 27 and the latter connects address coder 24 to modem 28. Switch 27 needs no complete disclosure since switches of this type are commonly used in data terminal equipments for controlling modems.

In the event of an audioconference between more than two rooms, the speaker comprises two partial addresses: the room address and the speaker address in the room. The room address controls the blue lamps and the speaker's address controls the green lamps.

The data or the speaker's address signal modulate of modem 28 and the output modulated signals of modem 28 together with the audiofrequency signals amplified by amplifier-limiter circuit 29 are applied to transmit line $5_1$ via interface 4.

As shown in FIG. 3B, receive equipment 3 receives via receive line $5_2$ and across interface 4 the voice signals, the identification signals and possibly data transmitted by the associated transmit equipment in a distant room.

Over a first channel, stop-band filter 35, identical to stop-band filter 25, transmits solely the received mixed autiofrequency signals to loudspeaker assembly 14 across tone corrector 32 adjusted as necessary for suitably listening in a given room, amplifier 39 and lead 31.

Over a second channel, pass-band filter $23_2$, identical to the filters incorporated in detector units $23_1$ to $23_6$, delivers only those signals comprised in the telegraphic channel bandwidth $\Delta F$ to modem 38. Modem 38 is connected to switch 37 which has two output terminals, the first of which being connected to address decoder 34 and the second of which to data receiver 36. As it is well known in the art of data terminal equipment, transmit switch 27 transmits, when switching over, a particular switching function signal which controls receive switch 37 in such a manner that the state "switch 27 connected to data transmitter 26" corresponds to the state "switch 37 connected to data receiver 36" and the state "switch 27 connected to address coder 24" corresponds to the state "switch 37 connected to address decoder 34".

Address decoder 34 decodes the room address and sends an illumination signal on a given output wire selected out of three such wires $33_1$, $33_2$, $33_3$. This illumination signal illuminates the desired blue lamps. Address decoder 34 also decodes the speaker's address and sends an illumination signal on a given output wire selected out of six such wires $31_1'$ to $31_6'$. This latter illumination signal illuminates the desired green lamp.

Figure 4:
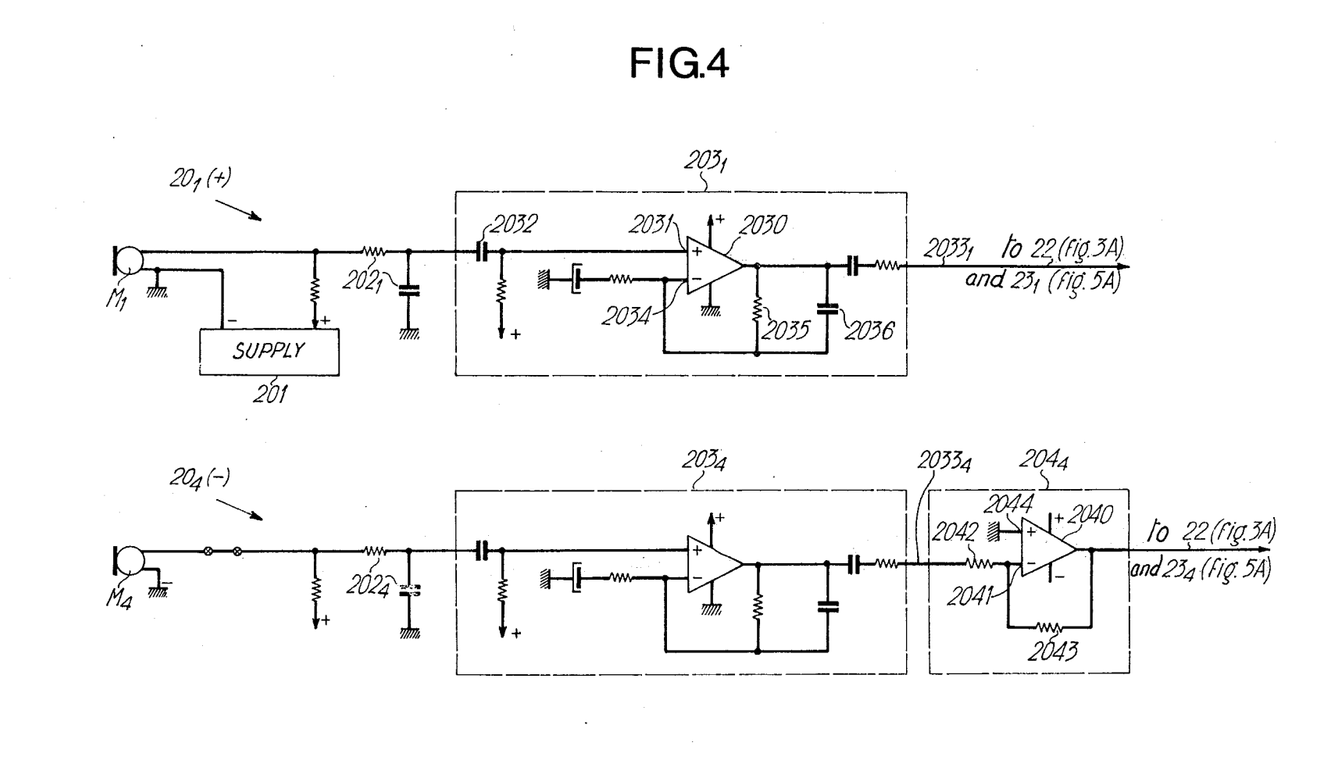
FIG. 4 gives a detailed diagram of a pair of devices for preamplification and protecting against self-oscillating allocated to a pair of symetrical microphones.

Referring now to FIG. 4, only the pair of preamplification and anti-priming units $20_1$ and $20_4$ generating audiofrequency signals in phase opposition with respect to each other have been represented, the other pairs of units, $20_2$, $20_5$ and $20_3$, $20_6$ being identical.

As already pointed out in reference to FIG. 1, the six microphones $M_1$ to $M_6$ are equally spaced apart about the centre of table 1 which is also the exact location of loudspeaker assembly 14, the microphones and lousepeaker assembly being in the so-called zone of direct acoustic field. In this way, only the direct field stemming from louspeaker assembly 14 can set up self-priming by acoustic coupling between loudspeaker assembly 14 and the microphones $M_1$ to $M_6$. As a result, each microphone in a symetrical pair, such as $M_1$, $M_4$, receives equal levels of acoustic pressure from louspeaker assembly 14 which are eliminated by phase opposition. To this end, those units with odd indices, i.e. $20_1$, $20_3$ and $20_5$, generate signals cophasal with the acoustic signal produced by the loudspeaker assembly whereas those units with even indices, i.e. $20_2$, $20_4$ and $20_6$ generate, via an 180° phase shifter, signals in phase opposition with the loudspeaker assembly acoustic signal. These two groups of units 20 have been indicated by + (odd indices) and − (even indices) signs respectively in FIGS. 1 and 3A.

As illustrated in FIG. 4, and unit $20_1$ has its input connected to an electret type associated microphone $M_1$ which encloses a preamplifier (not shown) suitably fed with D.C. current supply 201. The audiofrequency signal transmitted by microphone $M_1$ across pass-band filter $202_1$ has its high frequency components cut out. Then via amplifier stage $203_1$, the filtered signal is amplified before being detected in detector unit $23_1$ and mixed with other signals coming from other preamplification and anti-priming units in mixing unit 22. Amplifier stage $203_1$ is made up of operational amplifier 2030 receiving, at its non inverting input 2031, the filtered audiofraquency signal the direct component of which is removed by coupling capacitor 2032. Output 2033 is connected to the inverting input 2034 in a feedback arrangement via resistor 2035 in parallel with capacitor 2036 so as to obviate any unwanted oscillations.

In the case of a preamplification and anti-priming unit with an odd index such as $20_1$, output $2033_1$ of stage $203_1$ is wired directly to one of the inputs of mixing unit 22 as well as to the input of the corresponding detector unit $23_1$. On the other hand, the output $2033_4$ of stage $203_4$ of a preamplification and anti-priming unit with an even index such as $203_4$ is wired to mixing unit 22 and detector unit $23_4$ via 180° phase-shifter $204_4$. This latter phase-shifter is made up of operational amplifier 2040 arranged as an inverter circuit. In this connection, output $2033_4$ is linked to the inverting input 2041 of amplifier 2040 via resistor 2042 having a resistance equal to that of feedback resistor 2043, whereas the non-inverting input 2044 of amplifier 2040 is grounded.

Generally speaking, when the number of microphones M equally spaced apart about the center of the conference table is greater than 2, this invention teaches to arrange the microphones in groups of a determined number of microphones equally spaced apart about the table center and to associate to the microphones of a group, phase-shifters connected to the outputs of the respective preamplification and anti-priming units. The phase-shifters in each group therefore have phase differences of $2\pi/n$ if n is the number of microphones of the group. For instance, for a group of three microphones with positions around a table the same as those for microphones $M_1$, $M_3$ and $M_5$ illustrated in FIG. 1, the phase-shifters of the group in question have phase angles equal to 0°, 120° and 240° respectively.

Figure 5A:
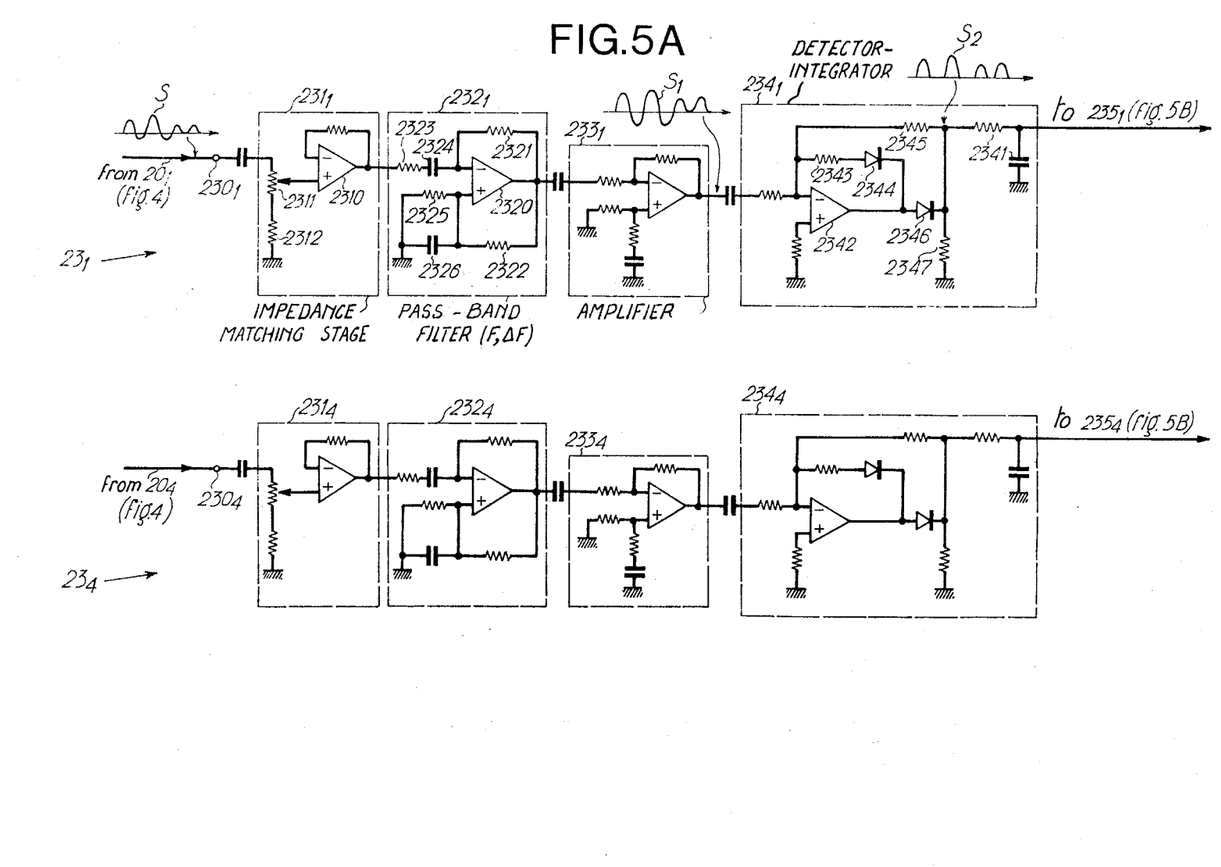
FIGS. 5A and 5B represent in detail the identification detector units linked to the symetrical microphones.
Figure 5B:
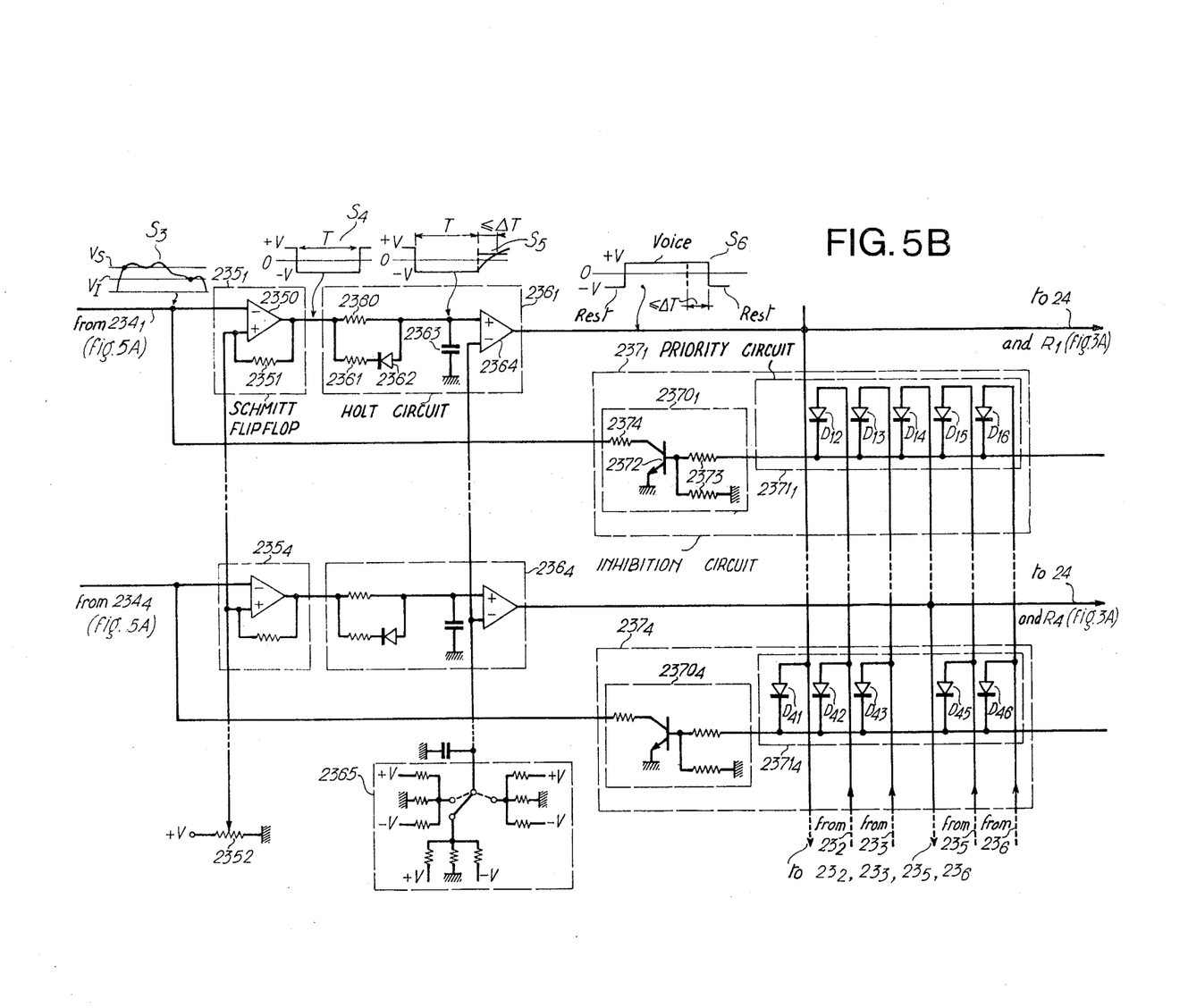

Turning now to FIGS. 5A and 5B, the pair of detector units $23_1$ and $23_4$ receiving the audiofrequency signals transmitted by preamplification and anti-priming units $20_1$ and $20_4$ at their inputs $230_1$ and $230_4$ are shown in detail. Detector unit $23_1$ is described later on, its structure being identical to those of detector units $23_2$ to $23_6$, with the exception of the inhibitor circuits located on the output side (FIG. 5B). All the detector units $23_1$ to $23_6$ are suitably fed from a D.C. current source lying between $+V$ and $-V$.

Input terminal $230_1$ of FIG. 5A is connected to output terminal $2033_1$ of FIG. 4. Input terminal $230_1$ is connected to an impedance matching stage $231_1$ (FIG. 5A), made up of operational amplifier 2310 which receives, via a voltage-divider consisting of adjustable resistor 2311 and fixed resistor 2312 connected to ground, the audiofrequency voice signals S from the speaker associated with microphone $M_1$ and possibly from loudspeaker assembly 14. This stage $231_1$ has a high input impedance and a gain equal to unity.

Impedance matching stage $231_1$ is connected to active passband filter $232_1$ tuned to frequency F which delivers solely the part of the spectrum of audiofrequency signals S lying in the $\Delta F$ range and, consequently, only those originating from the speaker's voice the spectrum of which lies in the $\Delta F$ range. In this way, the signalling will be independent of loudspeaker assembly 14, since the audiofrequency signals feeding the same pass through stop-band filter 35 (FIG. 3B) which eliminates the $\Delta F$ range. Filter 232 consists of operational amplifier 2320 with feedback resistors 2322 and 2321 to its non-inverting and inverting inputs, an input circuit comprising resistor 2323 in series with capacitor 2324 and an oscillating circuit comprising resistor 2325 and capacitor 2326 connected in parallel between the non-inverting input of amplifier 2320 and ground.

The filtered audiofrequency signal is next appropriately amplified in amplifier circuit $233_1$ (FIG. 5A) whose output signal $S_1$ is transmitted to detector-integrator stage $234_1$ assigned to microphone $M_1$. This stage $234_1$ comprises operational amplifier 2342 receiving signal $S_1$ at its inverting input, this input being connected to the amplifier output by a feedback circuit including resistor 2343 in series with diode 2344. The amplifier is loaded by diode 2346 and grounded resistor 2347. The point common to diode 2346 and resistor 2347 is connected to the inverting input by resistor 2345 and to the detector unit output by integrator circuit $234_1$.

The waveform $S_2$ of the output signal of detector 2342 is shown in FIG. 5A and the waveform $S_3$ of the output signal of integrator 2341 is shown in FIG. 5B.

Signal $S_3$ is applied to a Schmitt flipflop formed by operational amplifier 2350 and feedback resistor 2351. The non-inverting input of operational amplifier 2350 is linked to a variable resistor 2352 connected between ground and the positive terminal $+V$ of a direct current source. Variable resistor 2352 is common to all the Schmitt triggers of detector units $23_1$ to $23_6$.

The function of Schmitt flipflop $235_1$ is to convert the voice signal into a negative pulse the front and rear edges of which respectively occur when the voice voltage equals an upper threshold $V_S$ and a lower threshold $V_I$. This negative pulse indicates the detection of the voice of the associated speaker $L_1$ beginning to talk with an acoustic pressure level equal to or greater than the upper predetermined audibility threshold, i.e. as soon as the rising edge of signal $S_3$ reaches the voltage value, $V_S$. The duration T of pulse $S_4$ is equal to the time during which the voice signal of speaker $L_1$ remains above the lower acoustic audibility level $V_I$.

Pulse $S_4$ has its duration T extended by $\Delta T$ by means of a speech hold or sustaining circuit 236 (FIG. 5B) in order to obviate breaking up the identifications of the speaker during the short pauses between syllables of his speech. Indeed, if this kind of speech prolongation did not exist, another speaker could interrupt the identification of the speaker in question in the middle of his speech.

Sustainer circuit 236 includes, in the input circuit to the non inverting terminal of operational amplifier 2364, resistor 2360 in parallel with resistor 2361 and diode 2362, the latter two being in series and grounded capacitor 2363. Capacitor 2363 and resistor 2360 play a role similar to a delay circuit which gives to the rear edge of pulse $S_4$ and exponential waveform. Indeed, once pulse $S_4$ has been detected, capacitor 2363 is charged up and remains charged for as long as signal $S_3$ is above the lower threshold $V_I$. If, over a duration less than $\Delta T$, equal for example to an intersyllable interval, the amplitude of signal $S_3$ is less than threshold $V_I$, flipflop $235_1$ switches over to its state corresponding to $+V$ and capacitor 2363 discharges partially (signal $S_5$ in FIG. 5B) so that output signal $S_6$ of amplifier 2364 becomes a continuous and positive single pulse forming the identification signal, and having a duration equal to the sum of the durations of the possible pulses $S_4$ and of the intermediate discharge durations less than $\Delta T$.

To this end, amplifier 2364 has its inverting input connected to switching unit 2365 allowing the operator to select a set of different resistors as he wishes corresponding to various values of $\Delta T$ equal, for instance, to 200, 300 and 400 ms. Switching unit 2365 is also common to all the detectors $23_1$ to $23_6$.

As illustrated in FIG. 5B, signal $S_6$ is thus transmitted to both the inputs of priority circuits 237 pertaining to the other detector units and to address coder 24. The function of circuit $237_1$ of the detector unit $23_1$ is to inhibit the other detector units when the speaker in question talks by precluding the transmission of pulses $S_3$ coming from low-pass filters $234_2$, $234_3$, $234_4$ to the Schmitt flipflops $235_2$, $235_3$, $235_4$ incorporated in the other detector units (only filter $234_4$ is represented in FIG. 5A and only Schmitt flipflop $235_4$ is represented in FIG. 5B).

FIG. 5B also represents inhibition and priority circuit $237_1$ of detector unit $23_1$ which includes an inhibition circuit $2370_1$ whose input is controlled by pulses $S_6$ transmitted by the outputs of sustainer circuits $236_2$ to $236_6$ of the five other detector units $23_2$ to $23_6$ across diodes $D_{12}$ to $D_{16}$. These diodes make up the priority circuit $2371_1$.

Inhibition circuit $2370_1$ is made up of common-emitter transistor 2372, the base of which is connected via voltage divider 2373 to diodes $D_{12}$ to $D_{16}$ and the collector of which is connected via load resistor 2374 to the inverting input of Schmitt trigger $235_1$.

Figure 6:
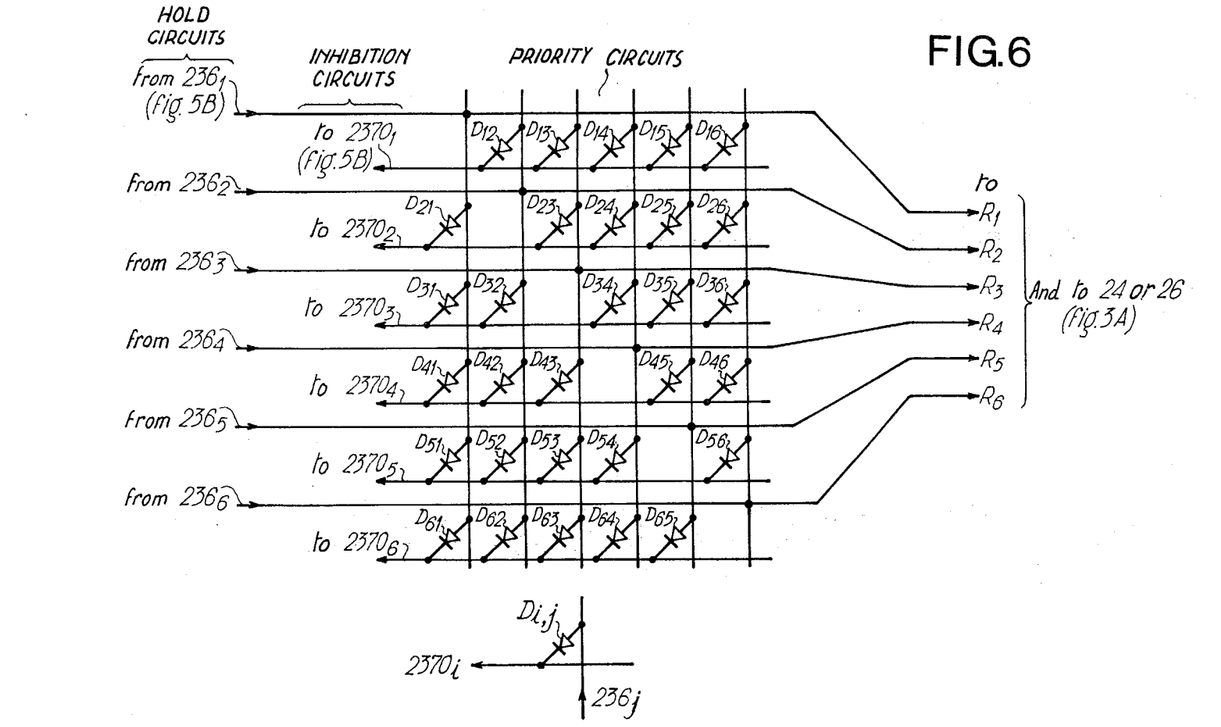
FIG. 6 shows the lay-out of the identification detector unit priority circuit.

As shown in FIG. 6, six priority circuits $2371_1$ to $2371_6$ each consisting of five diodes $D_{ij}$ are assigned to the six detectors $23_1$ to $23_6$. The diodes of this circuit form a priority matrix circuit in which the first subscript $i(i \neq j)$ designates a line connected to the input of the inhibition circuit $2370_i$ of detector unit $23_i$ and the second subscript J designates a column connected to the output of hold circuit $236_j$ of detector unit $23_j$.

For example, when speaker $L_3$ starts talking first, signal $S_6$ emanating from hold or sustainer circuit $236_3$ of detector unit $23_3$ controls, via diodes $D_{13}$, $D_{23}$, $D_{43}$, $D_{53}$ and $D_{63}$, the unblocking of transistors 2372 in inhibition circuits $2370_1$, $2370_2$, $2370_4$, $2370_5$ and $2370_6$ whose grounded outputs inhibit the transmission of signals $S_3$ to Schmitt flipflops $235_1$ $235_2$, $235_4$, $235_5$ and $235_6$. Consequently, only the identification pulse $S_6$ delivered by sustainer circuit $236_3$ of detector $23_3$ controls address coder 24 for transmitting speaker $L_3$'s address in the ΔF telegraphic band. Indeed, only signal $S_6$ derived from signal $S_3$ in detector unit $23_3$ can be generated since transistor 2372 of inhibition circuit $237_3$ is in the blocked state, due to the fact that diodes $D_{31}$, $D_{32}$, $D_{34}$, $D_{35}$ and $D_{36}$ receive no signal $s_6$. In this case, indicator lamp $R_3$ is activated and flickers.

If speaker $L_3$ stops talking and speaker $L_6$ takes the floor, detector unit $23_3$ associated with $L_3$ will be inhibited after a period of at least ΔT by the emission of a signal $s_6$ appearing at the output of detector unit $23_6$ associated with speaker $L_6$. Detector units $23_1$ to $23_5$ are therefore inhibited via diodes $D_{16}$ to $D_{56}$ in accordance with a procedure analogous to that already described.

In the event of no speaker taking up the conversation after the last one who spoke, namely speaker $L_3$, in keeping with the previous example, the signalling produced by the detector units of all the tables remains unaltered.

It will be noted that, contrary to the priority device of the previous state of the art, in which comparator of the speakers' voice acoustic levels give the priority to the speaker having the loudest voice, a priority matrix circuit (FIG. 6) according to the invention gives priority to the first speaker who starts talking regardless of the acoustic voice levels of the other speakers. Indeed, the first audiofrequency signal received, i.e. the first signal $S_3$ detected whose front edge rises the quickest and rises above upper threshold $V_S$, develops the identification of the first one who speaks although this speaker's voice may possibly be later on weaker than those of other speakers wishing to interrupt. This advantageously eliminates any wrong signalling.

Moreover, it will also be noted, when a speaker is not exactly in line with the directing angle of his microphone, that the detector units connected to the neighbouring microphones possibly receiving acoustic levels greater than threshold $V_S$ cannot develop an identification pulse $S_6$ since the propagation delay of acoustic waves between the speaker's microphone and the neighbouring ones produces a detection of signals $S_3$ originating from these neighbouring microphones later than that from signal $S_3$ coming from the microphone associated with the speaker in question.

What I claim is:

1. An audioconference system for conference connecting a plurality of groups of remotely located conferees, said system comprising at each conferee group location:
   a loudspeaker assembly;
   a plurality of microphones, each microphone of said plurality being assigned to a conferee;
   each of said plurality of microphones being spaced apart from said loudspeaker assembly by an equal radial distance to provide a circumferential array of opposed pairs of microphones and each being spaced apart from an adjacent microphone by an equal circumferential distance;
   said plurality of microphones being divided into microphone groups, each group having n microphones producing voice signals in the audiofrequency range;
   phase shifters connected to the microphones of a microphone group, said phase shifters providing phase angles of the audiofrequency signals transmitted by opposing pairs of microphones equal to $2\pi/n$;
   means for mixing the output audiofrequency signals of said opposed microphones which have been phase shifted by said phase shifters;
   a detection unit for each microphone which includes a pass band filter tuning onto a characteristic audiofrequency independent of acoustic coupling and the acoustic level of the loudspeaker assembly, whereby the acoustic level of the microphone only provides transmission of audiofrequency by the conferee at a microphone;
   a transmit stop band filter connected to said mixing means for cutting out the audiofrequency signals lying in the stop band width of said transmit stop band filter;
   address coder means identifying the location of a conferee relative to a specific microphone generating digital signals to identify a conferee who has begun speaking adapted to actuate an indicator for visual verification of the conferee and microphone;
   said address coder means being controlled by said pass band filter and said transmit stop band filter generating a carrier output whose frequency lies in said stop band filter band width modulated by said address digital signals;
   means for transmitting said audiofrequency signals filtered by said transmit stop band filter and said address digital signal modulated carrier to one or more remote conferee group locations;
   means for receiving from one or more remote conferee group locations said audiofrequency signals filtered by said transmit stop band filter and said address digital signal modulated carrier;
   a receive stop band filter substantially identical to said transmit stop band filter which is connected to said receiving means;
   filtering and demodulating means connected to said receiving means for filtering and demodulating said address digital signal modulated carrier; and
   address decoder means controlled by said filtering and demodulating means.

2. An audioconference system as set forth in claim 1 wherein the plurality of microphones is an even number, each group of microphones being formed of two microphones diametrically opposite with respect to said loudspeaker assembly with the phase shifters connected to the two microphones of a group having phase angles of 0° and 180°.

3. An audioconference system for conference connecting a plurality of groups of remotely located conferees, said system comprising at each conferee group location:

a loudspeaker assembly;

a plurality of microphones, each microphone of said plurality being assigned to a conferee;

each of said plurality of microphones being spaced apart from said loudspeaker assembly by an equal radial distance to provide a circumferential array of opposed pairs of microphones and each being spaced apart from an adjacent microphone by an equal circumferential distance;

said plurality of microphones being divided into microphone groups, each group having n microphones producing voice signals in the audiofrequency range;

a preamplifier for each microphone;

phase shifters connected to the microphones of a microphone group, said phase shifters providing phase angles of the audiofrequency signals transmitted by opposing pairs of microphones equal to $2\pi/n$;

means for mixing the output audiofrequency signals of said opposed microphones which have been phase shifted by said phase shifters;

a detection unit for each microphone which includes a pass band filter tuning onto a characteristic audiofrequency independent of acoustic coupling and the acoustic level of the loudspeaker assembly, whereby the acoustic level of the microphone only provides transmission of audiofrequency by the conferee at a microphone;

a transmit stop band filter connected to said mixing means for cutting out the audiofrequency signals lying in the stop band width of said transmit stop band filter;

address coder means identifying the location of a conferee relative to a specific microphone generating digital signals to identify a conferee who has begun speaking adapted to actuate an indicator for visual verification of the conferee and microphone;

said address coder means being controlled by said pass band filter and said transmit stop band filter generating a carrier output whose frequency lies in said stop band filter band width modulated by said address digital signals;

means for transmitting said audiofrequency signals filtered by said transmit stop band filter and said address digital signal modulated carrier to one or more remote conferee group locations;

means for receiving from one or more remote conferee group locations said audiofrequency signals filtered by said transmit stop band filter and said address digital signal modulated carrier;

a receive stop band filter substantially identical to said transmit stop band filter which is connected to said receiving means;

filtering and demodulating means connected to said receiving means for filtering and demodulating said address digital signal modulated carrier; and address decoder means controlled by said filtering and demodulating means.

* * * * *

UNITED STATES PATENT AND TRADEMARK OFFICE
CERTIFICATE OF CORRECTION

PATENT NO. : 4,184,048

DATED : January 15, 1980

INVENTOR(S) : Andre Alcaide

It is certified that error appears in the above—identified patent and that said Letters Patent is hereby corrected as shown below:

On the title page item (73), second Assignee, should read:

-- Compagnie Francaise De Cables Sous-marins Et De Radio, Paris, France --.

Signed and Sealed this

Thirteenth Day of April 1982

|SEAL|

Attest:

GERALD J. MOSSINGHOFF

Attesting Officer     Commissioner of Patents and Trademarks